United States Patent
Zhao et al.

(10) Patent No.: US 10,749,813 B1
(45) Date of Patent: Aug. 18, 2020

(54) SPATIAL-TEMPORAL CLOUD RESOURCE SCHEDULING

(71) Applicants: EMC Corporation, Hopkinton, MA (US); EMC IP Holding Company LLC, Hopkinton, MA (US)

(72) Inventors: Accela Zhao, Shanghai (CN); Yu Cao, Beijing (CN); Simon Tao, Shanghai (CN); Sanping Li, Beijing (CN); Kenneth Durazzo, San Ramon, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 306 days.

(21) Appl. No.: 15/079,406

(22) Filed: Mar. 24, 2016

(51) Int. Cl.
*G06F 15/16* (2006.01)
*H04L 12/911* (2013.01)
*H04L 29/08* (2006.01)
*H04L 12/927* (2013.01)

(52) U.S. Cl.
CPC ............ *H04L 47/70* (2013.01); *H04L 47/805* (2013.01); *H04L 67/10* (2013.01)

(58) Field of Classification Search
CPC .................................................... H04L 47/72
See application file for complete search history.

(56) References Cited

U.S. PATENT DOCUMENTS

| | | | | |
|---|---|---|---|---|
| 6,578,005 B1 * | 6/2003 | Lesaint | ................... | G06Q 10/06 705/7.14 |
| 8,214,461 B1 * | 7/2012 | Graupner | .............. | G06F 9/5011 707/755 |
| 8,650,298 B2 * | 2/2014 | Daly | ....................... | G06F 9/505 709/226 |
| 9,219,669 B2 * | 12/2015 | Morgan | ................... | H04L 12/00 |
| 9,389,916 B1 * | 7/2016 | Miller | .................. | G06F 11/3024 |
| 9,727,829 B2 * | 8/2017 | Bollapragada | ....... | G06Q 10/043 |
| 9,953,351 B1 * | 4/2018 | Sivasubramanian | ........ | G06Q 30/0283 |
| 2005/0105905 A1 * | 5/2005 | Ovadia | ................... | H04L 45/62 398/47 |
| 2005/0157644 A1 * | 7/2005 | Johansson | ............... | H04L 47/72 370/229 |

(Continued)

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

*Primary Examiner* — Hamza N Algibhah
(74) *Attorney, Agent, or Firm* — Ryan, Mason & Lewis, LLP

(57) ABSTRACT

A scheduler module receives a first allocation request for a given amount of a resource in a cloud computing platform that an application program currently needs. The scheduler module allocates the given amount of the resource to the application program for a first time slot. The given amount of allocated resource is received back at the scheduler module upon expiration of the first time slot for subsequent allocation. The scheduler module receives a second allocation request for a given amount of a resource that an application program currently needs. The scheduler module allocates the given amount of the resource to the application program for a second time slot. The given amount of allocated resource is received back at the scheduler module upon expiration of the second time slot for subsequent allocation.

20 Claims, 3 Drawing Sheets

(56) References Cited

U.S. PATENT DOCUMENTS

| | | | |
|---|---|---|---|
| 2005/0228850 A1* | 10/2005 | Zhu | G06F 9/5005 709/200 |
| 2006/0167703 A1* | 7/2006 | Yakov | B23K 1/0016 705/26.1 |
| 2006/0253855 A1* | 11/2006 | Grabarnik | G06F 9/505 718/104 |
| 2007/0133438 A1* | 6/2007 | Shaffer | H04L 12/1813 370/260 |
| 2007/0245351 A1* | 10/2007 | Sussman | G06F 9/50 718/104 |
| 2009/0165022 A1* | 6/2009 | Madsen | G06Q 10/109 719/318 |
| 2009/0193122 A1* | 7/2009 | Krishamurthy | G06F 9/5088 709/226 |
| 2010/0005473 A1* | 1/2010 | Blanding | G06F 9/5044 718/104 |
| 2010/0131959 A1* | 5/2010 | Spiers | G06F 9/50 718/105 |
| 2010/0229174 A1* | 9/2010 | Mukherjee | G06F 9/52 718/103 |
| 2011/0125539 A1* | 5/2011 | Bollapragada | G06Q 10/043 705/7.12 |
| 2012/0042320 A1* | 2/2012 | Jamjoom | G06F 9/50 718/104 |
| 2012/0079497 A1* | 3/2012 | Gangemi | G06F 9/5011 718/104 |
| 2012/0173477 A1* | 7/2012 | Coutts | G06F 16/217 707/602 |
| 2012/0191536 A1* | 7/2012 | Chen | G06Q 30/02 705/14.49 |
| 2012/0226808 A1* | 9/2012 | Morgan | G06F 9/5072 709/226 |
| 2012/0294288 A1* | 11/2012 | Chin | H04W 72/0446 370/335 |
| 2013/0046998 A1* | 2/2013 | Brown | G06F 1/3234 713/300 |
| 2013/0055262 A1* | 2/2013 | Lubsey | G06F 9/5072 718/1 |
| 2013/0246511 A1* | 9/2013 | Brown | H04L 67/28 709/203 |
| 2014/0164623 A1* | 6/2014 | Galan | G06Q 10/06 709/226 |
| 2014/0197964 A1* | 7/2014 | Idnani | H04Q 9/00 340/870.02 |
| 2014/0215080 A1* | 7/2014 | Alabiso | H04L 47/70 709/226 |
| 2014/0235276 A1* | 8/2014 | Lefkowitz | H04W 4/02 455/456.3 |
| 2014/0282520 A1* | 9/2014 | Sabharwal | G06F 9/455 718/1 |
| 2015/0006711 A1* | 1/2015 | Schaad | H04L 67/1097 709/224 |
| 2015/0282166 A1* | 10/2015 | Zhao | H04W 72/1221 370/336 |
| 2015/0381711 A1* | 12/2015 | Singh | H04L 41/0813 709/221 |
| 2016/0128083 A1* | 5/2016 | Shakya | G06F 9/5072 455/406 |
| 2016/0147564 A1* | 5/2016 | Marr | G06F 9/5027 718/103 |
| 2016/0183276 A1* | 6/2016 | Marinier | H04W 72/02 370/329 |
| 2016/0253215 A1* | 9/2016 | Fang | G06F 1/329 718/104 |
| 2016/0283274 A1* | 9/2016 | Kochunni | G06F 9/5011 |
| 2016/0294889 A1* | 10/2016 | George | H04L 65/403 |
| 2016/0381133 A1* | 12/2016 | Palavalli | H04L 67/10 709/226 |
| 2017/0034844 A1* | 2/2017 | Khoury | H04W 74/04 |
| 2017/0083367 A1* | 3/2017 | Chen | G06F 9/485 |
| 2017/0091688 A1* | 3/2017 | Lopes | G06Q 10/06314 |
| 2017/0124513 A1* | 5/2017 | Boss | G06Q 10/103 |
| 2017/0142023 A1* | 5/2017 | Yadav | H04L 47/70 |
| 2017/0169397 A1* | 6/2017 | Castelli | G06Q 10/1095 |
| 2017/0195246 A1* | 7/2017 | Kurian | H04L 47/70 |
| 2017/0230989 A1* | 8/2017 | Garcia | H04W 72/1205 |
| 2017/0236097 A1* | 8/2017 | Smith | G06Q 10/1095 705/7.19 |
| 2017/0251467 A1* | 8/2017 | Dame | H04W 4/38 |
| 2017/0329639 A1* | 11/2017 | Morper | G06F 9/5072 |
| 2017/0339708 A1* | 11/2017 | Rask | H04W 72/1226 |

\* cited by examiner

SPATIAL-TEMPORAL CLOUD RESOURCE SCHEDULING

FIELD

The field relates generally to computing environments, and more particularly to resource scheduling in such computing environments.

BACKGROUND

Computing environments, such as data centers, frequently employ cloud computing platforms, where "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. Cloud-based data centers are deployed and managed by cloud service providers, who provide a computing environment for customers (tenants) to run their application programs (e.g. business applications or otherwise).

In a cloud-based data center, various disparate types of application workloads share the same underlying resources. Thus, conflicting demands between application service level agreements (SLAs in place between the cloud service providers and tenants) and cloud resource efficiency pose a significant challenge for existing resource scheduling algorithms (schedulers) used by the data center.

SUMMARY

Embodiments of the invention provide techniques for spatial-temporal resource scheduling in a computing environment.

For example, in one embodiment, a method comprises the following steps. A scheduler module receives a first allocation request for a given amount of a resource in a cloud computing platform that an application program currently needs. The scheduler module allocates the given amount of the resource to the application program for a first time slot. The given amount of allocated resource is received back at the scheduler module upon expiration of the first time slot for subsequent allocation. The scheduler module receives a second allocation request for a given amount of a resource that an application program currently needs. The scheduler module allocates the given amount of the resource to the application program for a second time slot. The given amount of allocated resource is received back at the scheduler module upon expiration of the second time slot for subsequent allocation.

Advantageously, the given amount of the resource allocated (spatial aspect of the resource scheduler) for each of the first and second time slots (temporal aspect of the resource scheduler) is selected to attempt to satisfy a service level agreement (SLA) satisfaction metric established between an owner (tenant) of the application program and a service provider of the cloud computing platform. Concurrently, the allocation of the needed amount of the resource for each of the first and second time slots attempts to increase a resource usage efficiency metric of the cloud computing platform. Thus, a balance between SLA satisfaction and resource usage efficiency is established by the spatial-temporal resource scheduler.

These and other features and advantages of the invention will become more readily apparent from the accompanying drawings and the following detailed description.

DETAILED DESCRIPTION

Figure 1:
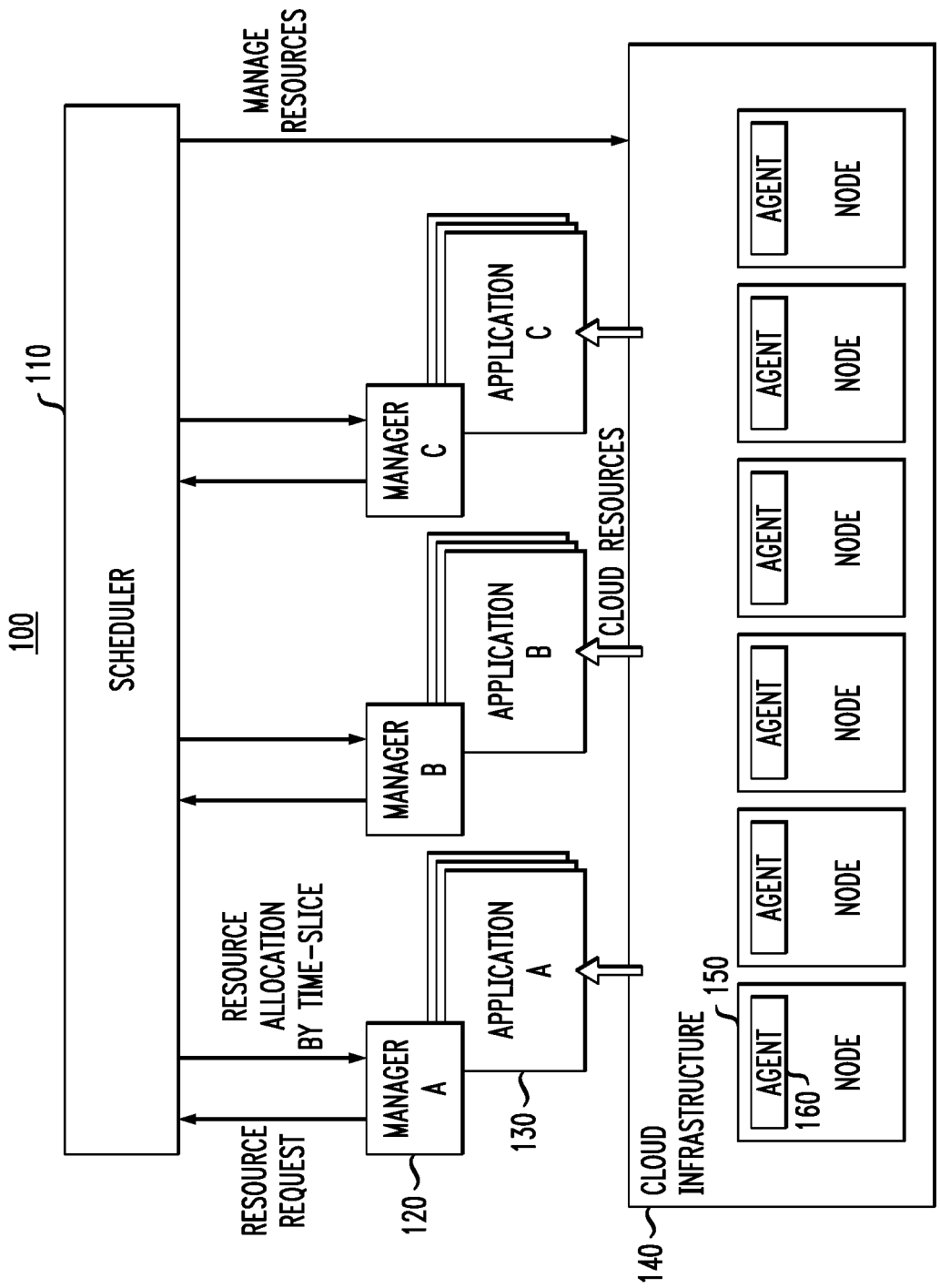
FIG. 1 illustrates a cloud computing platform with a spatial-temporal resource scheduler, according to an embodiment of the invention.

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "data lake," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As mentioned above, in a cloud environment, mixed application workloads share the same underlying infrastructure. The conflicting demands between application SLA and cloud resource efficiency pose a significant challenge to schedulers. Until 100% cloud resource utilization is achieved, there is always a place for a better scheduler.

Existing schedulers try to determine "where" to place resource, i.e., they address a "spatial" problem. However, it is realized herein that the actual application resource consumption changes by "time," i.e., a "temporal" problem. Without recognizing the time factor, existing schedulers fail to close the gap between resources allocated and resources actually consumed. Thus, resource wasting is unavoidable with existing schedulers.

Based at least in part on the above realization, embodiments of the invention provide a scheduler generic framework that takes both resource placement (spatial aspect) and a time factor (temporal aspect) into account. Each amount of resource allocated is bound with a limited time-slice, i.e., in a given time slot. Thus, an application program works with the scheduler and adjusts resource allocation according to actual resource consumption on a time-slice granularity. Advantageously, such a spatial-temporal scheduler according to embodiments of the invention reduces waste, and improves cloud resource efficiency, while ensuring requirements of the application SLA.

Note that the following detailed description utilizes alphanumeric labels (e.g., A1, A2, ... P4) to refer to various types, problems, steps, conditions, etc. The use of the alphanumeric labels is intended to allow for easy reference throughout the detailed description of the various types, problems, steps, conditions, etc. to which they refer.

In an illustrative embodiment, applications are divided into the following categories:

A1: Services or service type applications interact with user requests. The workload of a service changes by time, so its resource consumption may contain spikes, e.g., low at midnight, and high at noon. The SLA is complied with by serving enough resources within a tolerable respond time. Examples of this kind of application include, but are not limited to, Web, database (DB), network file system (NFS), message queue, etc.

A2: Batch jobs or batch job type applications have no interaction with users. Their workload is defined by consumption of all allocated resources. The SLA is complied with by finishing the given task before the deadline. Examples of this kind of applications include, but are not limited to, Hadoop jobs, batch scripts, extract-transform-load (ETL) tasks, etc.

Applications have priorities. The cloud environment should first satisfy higher priority applications before lower priority ones. The SLA is mapped to the cloud resource that is being allocated, i.e., if enough of a resource is given to the application, the SLA will be met. Cloud resources are categorized into the following categories:

R1: Transient resources are indifferent to an application. If an application is moved from one set of transient resources to another of the same amount, the application behaves the same. Examples of transient resources include, but are not limited to, central processing unit (CPU), memory, disk bandwidth, network bandwidth, etc.

R2: Persistent resources contain application states, e.g., a disk where the application (e.g., DB) has written its data. If it is changed to another disk of the same capacity, the application will not behave the same (e.g., due to lost data). Examples of persistent resources include, but are not limited to, local disk.

Resource efficiency (or resource utilization) is divided into the following conditions (these conditions are the reasons why cloud resource utilization is not 100%):

E1: The gap between how much resource is allocated and how much the application actually consumes (essentially, the smaller the gap, the higher the efficiency).

E2: The resources which are leftover (and which are too small or fragmented to fit an application request).

Existing resource schedulers can be categorized as follows:

S1: Rule-policy based schedulers. Rules and policies are chained together, filter through all available resources, and the appropriate resource for the application is determined.

S2: Constraint based schedulers. Business requirements are represented in equations, i.e., constraints. The constraints are grouped together, solved by dynamic programming, and the appropriate resource for the application is determined.

S3: Intelligence schedulers. Real-time feedback from the cloud environment is used as input. Machine learning algorithms are employed to dynamically select and change scheduler strategy in runtime. Compared with S1 and S2, scheduler strategies of the former two are static.

It is crucial to satisfy application SLA and critical to maintain high resource efficiency in the cloud environment. The application owner demands the SLA for cloud resources to serve customers and fulfill business goals. The cloud provider demands higher cloud resource efficiency to reduce operation cost and achieve a high margin.

However, SLA and resource efficiency are by nature conflicting. Extra resources allocated to an application ease the tension of the SLA, but it introduces unavoidable resource wasting. Overcommitting is widely used in a cloud environment but creates potential risk to violate the SLA upon sudden workload spikes. It is more efficient for applications to share physical nodes, but application owners are concerned about the activities of the application owners with whom they share the physical nodes.

The scheduler stands in the middle of conflicting demands between the application SLA and cloud resource efficiency. How much of a resource to allocate, whom to allocate to, and whether to allocate, determines SLA fulfillment. Where resources are placed, and how to pack them, affects the efficiency.

Existing schedulers S1-S3 do well for serving applications A1 and A2 with resources R1 and R2. However, it is difficult to eliminate the gap (E1 above) between how much an application actually consumes and the amount of resource allocated to it; especially when application owners tend to request the largest amount of resources for the entire time to secure their SLA, and especially when the resource consumption of A1 (service type applications) changes by time. As a result, resource wasting is unavoidable.

Thus, as mentioned above, until 100% resource utilization is achieved, there is always place for a better scheduler.

The common workflow of schedulers S1-S3 is modeled as below (note that some other frameworks like Mesos use a different workflow: resource offer, but the result still holds for what will be discussed):

Step 1: Application requests resource from scheduler.
Step 2: Scheduler allocates resource to application.
Step 3: Application runs on the allocated resource until it finishes.
Step 4: The allocated resource is freed and taken back by the scheduler.

Considering resource efficiency, there is enough work in schedulers S1-S3 to reduce conditions E1 and E2. Various algorithms are employed to decide resource placement.

However, the flaw resides in the workflow:

F1: The actual resource consumption of application A1 changes by time (step 3). It is dynamic. However:

F2: The size of the resource allocated to that application does not change (step 2). It is static.

As a result, no matter how well schedulers S1-S3 do resource placement, the gap between F1 and F2 cannot be eliminated. It adds to resource inefficiency E1. The flaw of schedulers S1-S3 is by design.

The root cause is that S1-S3 treat the scheduling problem as resource placement, i.e., where to put the resource. The "where" is location based, it is called the "spatial" factor or aspect of the scheduler. Embodiments of the invention realize that what is missed is the "temporal" factor or aspect, i.e., "time". The actual resource consumption of application A1 changes by time. However, existing scheduler allocation remains static. Even if application auto-scaling is used to mitigate the "time" problem, it is a remedy rather than a root cause solution.

The resources allocated should respond to the time factor, rather than keeping static. From the application perspective, a transient resource R1 can be transparently resized or moved. However, a persistent resource R2 needs to be handled carefully, unless shared storage is used.

Embodiments of the invention provide a scheduler that takes both spatial (where) and temporal (time) factors into consideration such that cloud resource efficiency can be improved while satisfying the application SLA. This is achieved by adding a time factor to the scheduler. Different from previous existing schedulers S1-S3, in a spatial-temporal scheduler:

D1: Each resource allocation is bound with a limited time-slice (time slot). The resource is only available to the application within this time-slice. Thereafter, the resource will be taken back by the scheduler. The application has to either obtain a new resource allocation or be terminated.

As a result, the application is forced to request a new set of resources in each time-slice. The amount of resource allocated becomes dynamic in each time-slice according to the actual resource consumption. By closing in the gap between the two, the resource efficiency aspect (E1) is reduced.

To satisfy the application SLA, in each time-slice the application requests a new set of resource(s) according to its needs. If its resource needs change by time, e.g., a sudden workload spike, the application has a chance to request more in the following time-slices. Given a large enough amount of resource allocated to that application, the SLA will be met. The scheduler honors priority by serving higher priority application requests first.

Besides the time factor, the scheduler still needs to handle where to put the resource. For illustrative embodiments, this operation can be the same as with previous existing schedulers S1-S3, since they are able to do this sufficiently well.

FIG. 1 illustrates a cloud computing platform with a spatial-temporal resource scheduler, according to an embodiment of the invention. As shown, the environment 100 comprises a scheduler 110, one or more managers 120, one or more applications 130, cloud infrastructure 140, one or more compute nodes 150, and one or more agents 160. Each component/modules will be described below:

C1: Scheduler 110. The scheduler receives application resource requests and performs resource allocation. Each amount of allocated resource is bound with a limited time-slice. In illustrative embodiments, a time-slice is a pre-configured static value ranging from a minute to an hour, i.e., the time-granularity can be in one minute length increments (a first time-slice is from 0 to 1 minute, a second time slice is from 1 minute to 2 minutes, etc.) or one hour length increments. Of course, any other time-granularity can be employed depending on the nature of the cloud computing platform and the resources. The scheduler 110 keeps track of current resources available and what is allocated. Scheduler 110 employs the above-mentioned time-slice functionality to address the time (temporal) factor and scheduling techniques from one or more previous existing schedulers (S1-S3) to address the "where" (spatial) resource placement factor.

C2: Agent 160. The agent 160 runs on a compute node 150 of cloud infrastructure 140. The agent monitors and limits how much resource the application instance consumes. If the time-slice is used up and no more resource is allocated, the agent 160 terminates the application instance.

C3: Manager 120. The manager 120 closely works with the application 130. Each application has its individually associated manager. The manager 120 monitors the application status and decides how much resource to allocate in each time-slice via, for example, one or more prediction algorithms. The manager 120 sends a request to the scheduler 110, receives a response from the scheduler 110, and launches the application instance 130 according to the new resource location specified by the scheduler 110.

C4: Application 130. The application 130 runs on the cloud infrastructure 140. The applications consume cloud resources and try to fulfill an SLA. The application may consist of numbers of instances running on the cloud infrastructure 140 in a distributed manner. They are categorized into application types A1 and A2.

C5: Cloud Infrastructure 140. This is the cloud environment where mixed types of applications run on shared underlying resource pools. The cloud infrastructure provides applications with resources of compute, network and storage, categorized into resource types R1 and R2.

An illustrative workflow of scheduler 100 is as follows:

W1: Before a time-slice begins, the manager 120 decides the resource(s) needed in this time-slice and sends a request to the scheduler 110. How much resource is requested should reflect the actual application needs.

W2: The scheduler 110 receives the request, and decides resource placement and bounds it within a given time-slice. If several requests are received simultaneously, the scheduler 110 honors priority and serves the higher priority ones first. Upon a large resource request, the returned resource allocation may be discrete, which resides on several separated locations.

The cloud resource is categorized into R1 and R2. The scheduler is free to allocate resource type R1 because it is transient to the application. However, if an application instance is already consuming a certain amount of resource type R2, the next allocation should try to be in the same location, because R2 indicates persistent data in local location (local disk). To avoid an R2 type problem, the application can use shared storage.

W3.1: Manager 120 receives the resource. If there is already an application instance running on the resource location, notify the application instance, otherwise, launch a new application instance to consume the resource.

W3.2: At the same time, agent 160 is notified of the new resource allocation. The agent 160 enforces that the application instance uses no more than what is allocated, and cleans up those application instances whose time-slice has expired.

W4: Application 130 runs and consumes the allocated resource, to fulfill the SLA.

W5: When a new time-slice occurs, go to W1 and repeat.

Overall, as time-slice cycles, the manager 120 estimates further resource needs and requests them from the scheduler 110. The scheduler handles resource allocation while the agent enforces it. The application 130 is launched by the manager 120 and consumes what it has. In each time-slice, the closer the manager's resource estimation is to the actual resource consumption, the smaller the E1 gap. Cloud resource efficiency is therefore improved. Since the manager 120 is aware of how much resource the application 130 needs and how much it previously needed, the SLA can be satisfied by generating proper resource requests.

Application type A1 benefits the most from a spatial-temporal scheduler. Existing schedulers S1-S3 allocate resources of static size, ignoring the varying resource consumption by time. With a spatial-temporal scheduler, application type A1 is able to adjust what it requests and the allocation in each time-slice, closing the gap of E1.

Application type A2 does not have the varying nature of A1. However, with a properly implemented manager 120, A2 is able to respond to a revised job deadline, or unexpected change of total available resources, by requesting different amounts of resource in certain time-slices.

Applications that operate with a spatial-temporal scheduler should be:

H1: Resource elastic. Given more resource allocated, the application should be able to consume it and increase throughput reasonably. Given more resource allocation, but in different locations, new application instances should be able to launch and work together to consume the resource.

H2: Terminate-safe. When a time-slice expires, the application instance should be able to be terminated quickly. The termination can be a brute-force termination, or a cooperative termination by signaling the application instance and waiting for a limited time.

H3: Manager. The application has to be provided with its manager before running in the spatial-temporal scheduling framework. The manager can work in responsive ways, e.g., monitor application workload and adjust resource requests when a certain threshold is hit; or predictive ways, e.g., predict the workload in following time-slices and adjust resource requests. The manager can even be implemented very naively, with the consequence being lower overall resource efficiency.

Most modern applications are cloud-ready, which satisfies H1 and H2. With a simply implemented manager, they are ready to adopt a spatial-temporal scheduler. Stateless applications satisfy H1 and H2 by nature. They require an implementation of the manager, either simple or complex, before operating in the framework.

Another issue is related to high priority applications. To ensure that the SLA is satisfied, application owners may still want the manager to leave a large gap between resource requested and actual resource consumed. This weakens the resource efficiency gained by employing the spatial-temporal scheduler. However, the benefit still holds for lower priority applications, which contribute positively overall.

Below, issues related to the spatial-temporal scheduler which are implementation dependent are discussed.

Performance considerations. A smaller time-slice closes the gap between what is allocated and what is actually consumed, response time becomes shorter, and results in higher resource efficiency. However, this introduces more frequent resource requests, increases manager overhead and application re-launches, which eventually leads to performance degradation.

There are several ways to mitigate this problem:

M1: Use a larger time-slice, e.g. half an hour.

M2: Batch the requests of several time-slices together to reduce a total request count. Predict several future time-slices and batch them.

M3: Always allocate to the last location, so that the application instance does not need to be terminated and re-launched at the new location.

Container technologies. Container technologies (e.g., Docker) can be employed to implement a spatial-temporal scheduler:

N1: Launch application instance quickly. The application instance can be first packaged in a container, and then resumed when one needs to be launched. A container is by nature able to be quickly started and stopped.

N2: Terminate application quickly and safely. Since an application instance is packaged in a container, its states and dependencies are completely self-contained and isolated. The container can be quickly stopped. The termination happens on a container level and is transparent to the application instance.

N3: Limit resource consumption. Part of container technologies is the cgroup. Cgroup is supported from the kernel level and able to limit container resource consumption by CPU, memory, disk bandwidth, network bandwidth, etc.

Manager highly-available (HA). For an application to acquire a sufficient amount of resource and continue running, the manager is the key. There are several illustrative ways for the manager module to implement high-availability:

G1: Multiple manager instances running in an active-active fashion, with a single leader selected by Paxos quorum.

G2: Multiple manager instances running in active-active fashion, with no leader, and each manager instance in charge of a portion of the application instances (based on a reasonable partition strategy to map application instances to manager instances).

G3: One active manager instance as leader and one or several managers as standby instances. The active-standby logic can be implemented inside the manager or by Pacemaker.

The persistent data of the manager can be stored in a shared storage, DB or Paxos quorum.

Advantageously, as illustratively explained above, embodiments of the invention provide for each resource allocation to be bound to a limited time-slice or time slot, i.e., a time factor. The resource is only available to the application within that time-slice. In each time-slice, an application requests a new set of resource. The amount of resource allocated becomes dynamic in each time-slice. With a properly implemented manager module, how much resource is allocated closely coincides with how much the application actually consumes. Resource inefficiency E1 is reduced, especially for application type A1. With less resource allocated but not actually consumed, cloud resource efficiency is improved.

Considering existing schedulers S1-3, they handle resource placement well, but ignore that application resource consumption is dynamically changing over time, especially application type A1. However, with existing schedulers, the amount of resource allocated to an application is static. Without dynamically changing how much resource is allocated in each time-slice, S1-S3 fail to close the E1 gap.

By introducing a time aspect to scheduler resource allocation in accordance with embodiments of the invention, an application requests resource on a time-slice granularity. With a properly implemented manager, the SLA is taken into consideration and a proper amount of resource is requested for each time-slice. Given enough resource allocated to that application, the SLA is fulfilled. If the resource needs are changing by time, e.g., a sudden workload spike comes up, the application has a chance to adjust its resource request in the following time-slices. SLA violation is thus avoided.

Considering to existing schedulers S1-S3, the amount of resource allocated to an application is static over time. Given a sudden workload spike, the application has no chance to adjust its resource request and may suffer an SLA violation.

The following example illustrates how a spatial-temporal scheduler according to embodiments of the invention can be applied to a typical cloud scenario to improve resource efficiency while ensuring application SLA compliance.

Assume, in a cloud environment, that there are three types of applications: Web, Hadoop and batch jobs. They represent typical use cases, respectively, of business critical, offline analytical, and low priority workloads, which are running together on shared cloud infrastructure.

Before apply the spatial-temporal scheduler, assume the following conditions. A web application owner estimates required resource by peak workload. A Hadoop application owner estimates required resource by task deadline. A batch job application owner chooses to use whatever is left. Each owner submits their resource request to the scheduler, and their application launches on the allocated resources. The amount of allocated resource remains static (unchanged) until the application finishes. Then the problem would be:

P1: When the web application is not at peak workload, part of the allocated resource becomes idle. Resource wasting is unavoidable.

P2: When an unexpected workload spike comes, if higher than estimated peak workload, the web application will not have enough resource to handle it, nor does it have the chance to adjust resource allocation. The SLA might be violated.

P3: For a Hadoop application, if the task deadline is unexpectedly moved forward (earlier), the application will not have a chance to adjust its resource allocation to catch up with the deadline. The SLA might be violated.

P4: For a Hadoop application, if the cloud environment suddenly acquires more available resource than expected, the application will not have a chance to adjust the previous resource allocation to make use of that extra resource availability.

After applying a spatial-temporal scheduler, each application now has a manager module. In each time-slice, the manager monitors application status, estimates future resource needs, requests resources from the scheduler, and launches or notifies the application on new resources. The resources allocated to an application closely coincide with its actual consumption, dynamically adjusted in time-slice granularity. Thus, advantageously, the above problems are solved as follows:

P1: When the web application is not at peak workload, the manager estimates fewer resources, requests fewer resources, and the scheduler allocates fewer resources. Fewer resources are wasted because there are fewer resources allocated but not consumed.

P2: When an unexpected workload spike comes, the manager detects the sudden stress in the application status. Increasingly more resource is requested immediately in the next time-slice, to respond quickly to the spike, until the stress is relieved.

P3: When a deadline changes, the manager changes its estimation accordingly. In the next time-slice, more resource is requested so that the Hadoop application can finish its task in time.

P4: The manager detects the excessive amount of available cloud resource. In the next time-slice, more resource is requested. The scheduler handles it by priority so that higher priority applications will not be affected. After the Hadoop application acquires more allocated resources, it finishes its task earlier.

As a result, with a spatial-temporal scheduler according to embodiments of the invention, higher cloud resource efficiency is achieved. Both web application and Hadoop applications are able to work as expected and meet their SLAs. The low priority batch jobs still run on whatever resource is left. However, since problem P1 is solved, the application now has more resources to run.

Figure 2:
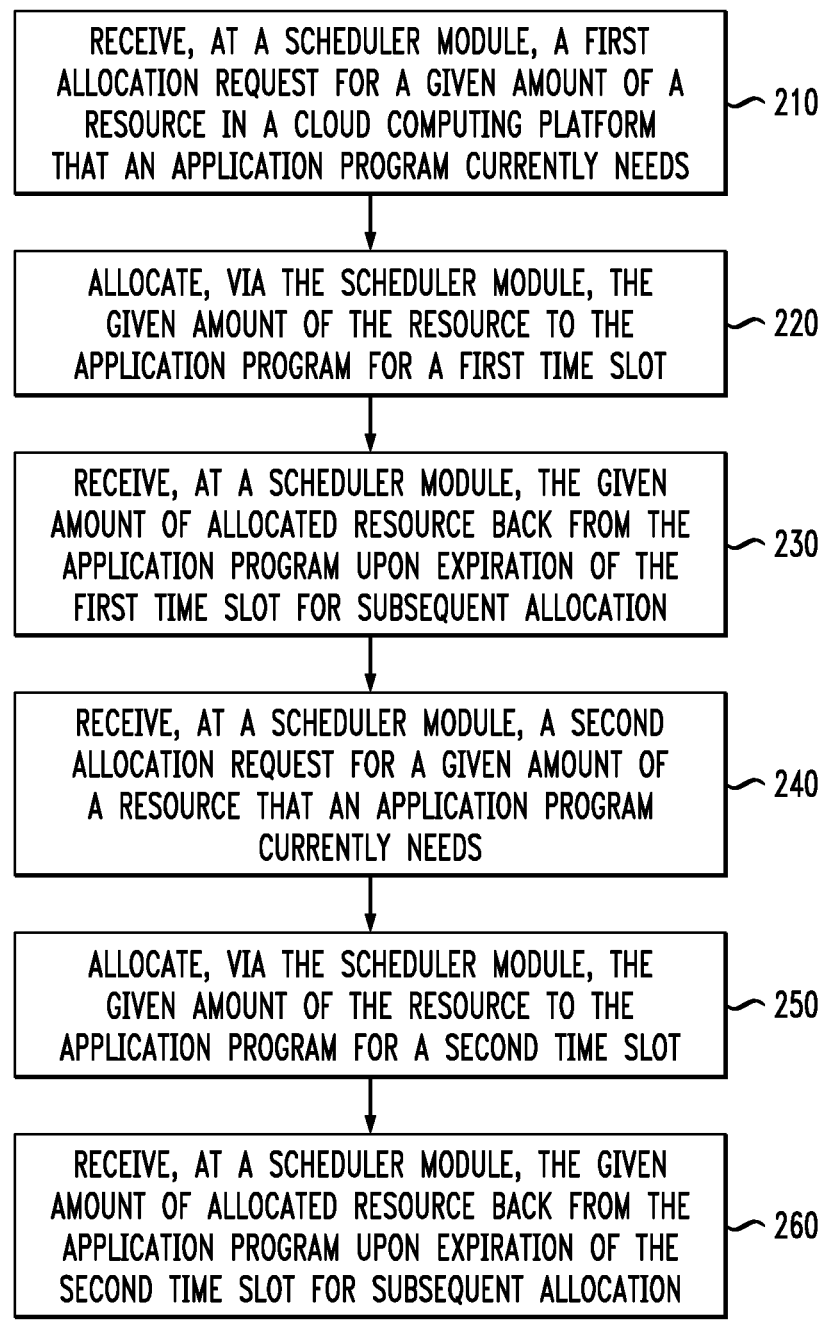
FIG. 2 illustrates a spatial-temporal resource scheduling methodology for use in a cloud computing platform, according to an embodiment of the invention.

FIG. 2 illustratively summarizes a spatial-temporal resource scheduling methodology for use in a cloud computing platform, according to an embodiment of the invention. For example, methodology 200 can execute in environment 100 of FIG. 1.

Step 210 receives, at a scheduler module (e.g., spatial-temporal scheduler 110), a first allocation request for a given amount of a resource in a cloud computing platform (e.g., 140) that an application program (e.g., 130) currently needs.

Step 220 allocates, via the scheduler module, the given amount of the resource to the application program for a first time slot.

Step 230 receives, at the scheduler module, the given amount of allocated resource back from the application program upon expiration of the first time slot for subsequent allocation.

Step 240 receives, at the scheduler module, a second allocation request for a given amount of a resource that the application program currently needs.

Step 250 allocates, via the scheduler module, the given amount of the resource to the application program for a second time slot.

Step 260 receives, at the scheduler module, the given amount of allocated resource back from the application program upon expiration of the second time slot for subsequent allocation.

Figure 3:
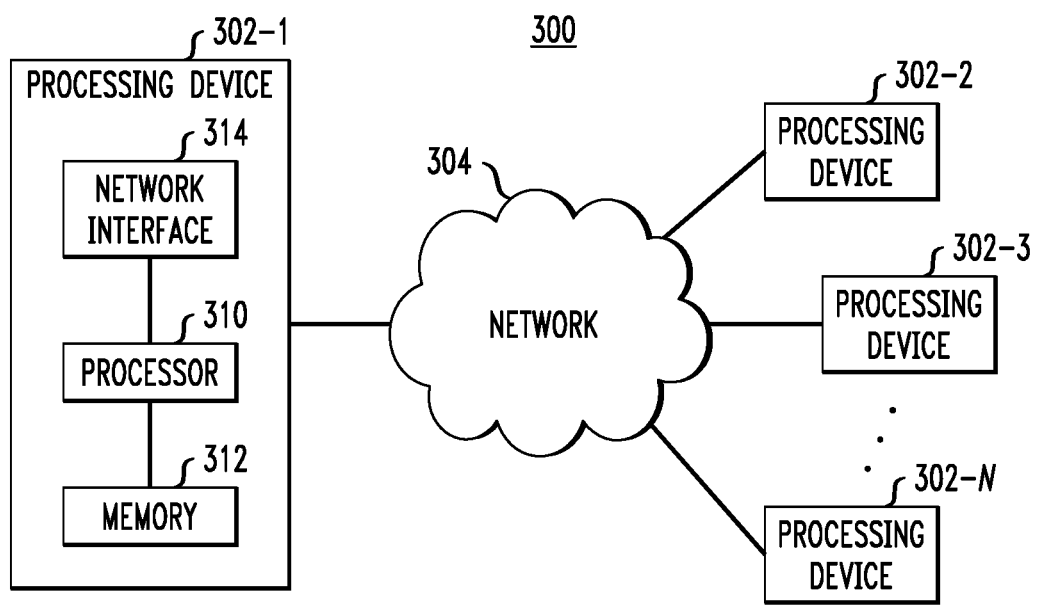
FIG. 3 illustrates a processing platform used to implement a cloud computing platform with a spatial-temporal resource scheduler, according to an embodiment of the invention.

As an example of a processing platform on which a computing environment such as a cloud computing platform with a spatial-temporal resource scheduler (e.g., 100 of FIG. 1) can be implemented is processing platform 300 shown in FIG. 3. It is to be appreciated that processing platform 300 may implement the functionalities described herein.

The processing platform 300 in this embodiment comprises a plurality of processing devices, denoted 302-1, 302-2, 302-3, . . . 302-N, which communicate with one another over a network 304. It is to be appreciated that the methodologies described herein may be executed in one such processing device 302, or executed in a distributed manner across two or more such processing devices 302. It is to be further appreciated that a server, a client device, a computing device or any other processing platform element may be viewed as an example of what is more generally referred to herein as a "processing device." As illustrated in FIG. 3, such a device generally comprises at least one processor and an associated memory, and implements one or more functional modules for instantiating and/or controlling features of systems and methodologies described herein. Multiple elements or modules may be implemented by a single processing device in a given embodiment.

The processing device 302-1 in the processing platform 300 comprises a processor 310 coupled to a memory 312. The processor 310 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 310. Memory 312 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 312 may comprise electronic memory such as random access memory (RAM), read-only memory (ROM) or other types of memory, in any combination. The one or more software programs when executed by a processing device such as the processing device 302-1 causes the device to perform functions associated with one or more of the components/steps of system/methodologies in FIGS. 1 and 2. One skilled in the art would be readily able to implement such software given the teachings provided herein. Other examples of processor-readable storage media embodying embodiments of the invention may include, for example, optical or magnetic disks.

Processing device 302-1 also includes network interface circuitry 314, which is used to interface the device with the network 304 and other system components. Such circuitry may comprise conventional transceivers of a type well known in the art.

The other processing devices 302 (302-2, 302-3, . . . 302-N) of the processing platform 300 are assumed to be configured in a manner similar to that shown for computing device 302-1 in the figure.

The processing platform 300 shown in FIG. 3 may comprise additional known components such as batch processing systems, parallel processing systems, physical machines, virtual machines, virtual switches, storage volumes, etc. Again, the particular processing platform shown in this figure is presented by way of example only, and the system shown as 300 in FIG. 3 may include additional or alternative processing platforms, as well as numerous distinct processing platforms in any combination.

Also, numerous other arrangements of servers, clients, computers, storage devices or other components are possible in processing platform 300. Such components can communicate with other elements of the processing platform 300 over any type of network, such as a wide area network (WAN), a local area network (LAN), a satellite network, a telephone or cable network, or various portions or combinations of these and other types of networks.

Furthermore, it is to be appreciated that the processing platform 300 of FIG. 3 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 300 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 300 in one or more embodiments of the invention is the VMware vSphere (commercially available from VMware Inc., Palo Alto, Calif.) which may have an associated virtual infrastructure management system such as the VMware vCenter. The underlying physical infrastructure may comprise one or more distributed processing platforms that include storage products such as, but not limited to, Isilon, VNX and VPLEX (commercially available from EMC Corporation, Hopkinton, Mass.). A variety of other computing and storage products may be utilized to implement the one or more services that provide the functionality and features described herein.

It was noted above that portions of the system environment 300 may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:

receiving, at a scheduler module, a first allocation request for a given amount of a resource in a cloud computing platform that an application program currently needs, the application program being a cloud-based application;

allocating, via the scheduler module, availability of the given amount of the resource requested in the first allocation request to the application program for a first time slot, wherein the first time slot is equivalent to at least a portion of a given time period needed by the application program;

receiving, at the scheduler module, availability of the given amount of allocated resource back from the application program upon expiration of the first time slot for subsequent allocation to one or more additional application programs, the one or more additional application programs each being a cloud-based application;

receiving, at the scheduler module, a second allocation request for a given amount of a resource that the application program currently needs;

allocating, via the scheduler module, availability of the given amount of the resource requested in the second allocation request to the application program for a second time slot, wherein the second time slot is equivalent to at least a portion of the given time period needed by the application program;

receiving, at the scheduler module, availability of the given amount of allocated resource back from the application program upon expiration of the second time slot for subsequent allocation to the one or more additional application programs; and repeating the request receiving, allocating, and receiving back steps for one or more additional time slots when needed for the given time period by the application program;

wherein the first allocation request and the second allocation request are received from a manager module instantiated for the application program;

wherein the manager module includes one or more prediction algorithms configured to dynamically predict the given amount of the resource that the application program needs for at least a given one of the first and second time slots based on actual consumption of allocated resources by the application program during at least one time slot prior to the given one of the first and second time slots;

wherein at least one of allocating availability of the given amount of the resource requested in the first allocation request to the application program in the first time slot and allocating availability of the given amount of the resource requested in the second allocation request to the application program in the second time slot comprises deploying one or more application instances in one or more virtual containers, each virtual container being associated with a kernel control group configured to limit resource consumption by a corresponding one of the application instances to the given amount of the resource requested in the at least one of the first time slot and the second time slot; and wherein the cloud computing platform, the manager module and the scheduler module are implemented on one or more processing devices operatively coupled by a communication network.

2. The method of claim 1, wherein for the same resource type, the given amount of resource requested in the second allocation request is a different amount than the given amount of resource requested in the first allocation request.

3. The method of claim 1, further comprising the scheduler module determining which specific resources in the cloud computing platform to allocate to the application program for the first and second allocation requests.

4. The method of claim 3, further comprising the scheduler module binding the specific resources to the first and second time slots to which they are respectively allocated.

5. The method of claim 1, further comprising the scheduler module responding to resource allocation requests for the application program or the one or more additional programs on a priority basis.

6. The method of claim 1, wherein, when the resource requested is a persistent resource, the scheduler module attempts to allocate the given amount of the resource for the second allocation request in the same location in the cloud computing platform as the given amount of the resource allocated for the first allocation request.

7. The method of claim 1, further comprising maintaining an agent module at the allocated resource to enforce that the application program uses no more of the resource than that which is allocated by the scheduler module.

8. The method of claim 1, wherein the allocated resources for each of the first time slot and the second time slot are resources needed to execute an instance of the application program.

9. The method of claim 8, further comprising terminating the application program instance when allocation of resources is not requested for a subsequent time slot.

10. The method of claim 1, wherein the one or more prediction algorithms are configured to dynamically predict the given amount of the resource that the application program needs for the first and second time slots, and further comprising batching the first and second allocation requests.

11. The method of claim 1, wherein the application program is a service-based application program.

12. The method of claim 1, wherein the application program is configured to exhibit at least one of a resource-elastic attribute or a terminate-safe attribute.

13. The method of claim 1, wherein the application program is packaged in a virtual container.

14. The method of claim 1, wherein the given amount of the resource allocated for each of the first and second time slots is selected to attempt to satisfy a service level agreement (SLA) satisfaction metric established between an owner of the application program and a service provider of the cloud computing platform.

15. The method of claim 14, wherein the allocation of the given amount of the resource for each of the first and second time slots attempts to increase a resource usage efficiency metric of the cloud computing platform.

16. The method of claim 1, wherein the manager module is configured to dynamically determine the given amount of allocated resource needed to comply with one or more service level agreement satisfaction metrics while reducing a gap between (i) an amount of resources allocated to the allocation program across a plurality of time slots of the given time period and (ii) actual consumption of allocated resources by the application program across the plurality of time slots of the given time period.

17. The method of claim 1, wherein the manager module is configured to dynamically change, utilizing the one or more prediction algorithms, a request for a given other amount of resources in the one or more additional time slots based on a change in the given time period needed by the application program.

18. An article of manufacture comprising a processor-readable storage medium having encoded therein executable code of one or more software programs, wherein the one or more software programs when executed by one or more processing devices cause the one or more processing devices to perform the steps of:

receiving, at a scheduler module, a first allocation request for a given amount of a resource in a cloud computing platform that an application program currently needs, the application being a cloud-based application;

allocating, via the scheduler module, availability of the given amount of the resource requested in the first allocation request to the application program for a first time slot, wherein the first time slot is equivalent to at least a portion of a given time period needed by the application program;

receiving, at the scheduler module, availability of the given amount of allocated resource back from the application program upon expiration of the first time slot for subsequent allocation to one or more additional application programs, the one or more additional application programs each being a cloud-based application;

receiving, at the scheduler module, a second allocation request for a given amount of a resource that the application program still currently needs;

allocating, via the scheduler module, availability of the given amount of the resource requested in the second allocation request to the application program for a second time slot, wherein the second time slot is equivalent to at least a portion of the given time period needed by the application program;

receiving, at the scheduler module, availability of the given amount of allocated resource back from the application program upon expiration of the second time slot for subsequent allocation to the one or more additional application programs; and repeating the request receiving, allocating, and receiving back steps for one or more additional time slots when needed for the given time period by the application program;

wherein the first allocation request and the second allocation request are received from a manager module instantiated for the application program;

wherein the manager module includes one or more prediction algorithms configured to dynamically predict the given amount of the resource that the application program needs for at least a given one of the first and second time slots based on actual consumption of allocated resources by the application program during at least one time slot prior to the given one of the first and second time slots; and wherein at least one of allocating availability of the given amount of the resource requested in the first allocation request to the application program in the first time slot and allocating availability of the given amount of the resource requested in the second allocation request to the application program in the second time slot comprises deploying one or more application instances in one or more virtual containers, each virtual container being associated with a kernel control group configured to limit resource consumption by a corresponding one of the application instances to the given amount of the resource requested in the at least one of the first time slot and the second time slot.

19. An apparatus, comprising:

at least one processor and a memory, operatively coupled to the processor, configured to form a scheduler module to: receive a first allocation request for a given amount of a resource in a cloud computing platform that an application program currently needs, the application being a cloud-based application; allocate availability of the given amount of the resource requested in the first allocation request to the application program for a first time slot, wherein the first time slot is equivalent to at least a portion of a given time period needed by the application program; receive availability of the given amount of allocated resource back from the application program upon expiration of the first time slot for subsequent allocation to one or more additional application programs, the one or more additional application programs each being a cloud-based application; receive a second allocation request for a given amount of a resource that the application program still currently needs; allocate availability of the given amount of the resource requested in the second allocation request to the application program for a second time slot, wherein the second time slot is equivalent to at least a portion of the given time period needed by the application program; receive availability of the given amount of allocated resource back from the application program upon expiration of the second time slot for subsequent allocation to the one or more additional application programs; and repeat the request receiving, allocating, and receiving back steps for one or more additional time slots when needed for the given time period by the application program;

wherein the first allocation request and the second allocation request are received from a manager module instantiated for the application program; and wherein the manager module includes one or more prediction algorithms configured to dynamically predict the given amount of the resource that the application program needs for at least a given one of the first and second time slots based on actual consumption of allocated resources by the application program during at least one time slot prior to the given one of the first and second time slots; and wherein at least one of allocating availability of the given amount of the resource requested in the first allocation request to the application program in the first time slot and allocating availability of the given amount of the resource requested in the second allocation request to the application program in the second time slot comprises deploying one or more application instances in one or more virtual containers, each virtual container being associated with a kernel control group configured to limit resource consumption by a corresponding one of the application instances to the given amount of the resource requested in the at least one of the first time slot and the second time slot.

20. The article of manufacture of claim 19, wherein the manager module is configured to dynamically determine the given amount of allocated resource needed to comply with one or more service level agreement satisfaction metrics while reducing a gap between (i) an amount of resources allocated to the allocation program across a plurality of time slots of the given time period and (ii) actual consumption of allocated resources by the application program across the plurality of time slots of the given time period.

* * * * *